(12) United States Patent
Casas et al.

(10) Patent No.: US 9,152,972 B2
(45) Date of Patent: Oct. 6, 2015

(54) DATA IMPORTER FOR A SALES PROSPECTOR

(75) Inventors: Francisco V. Casas, San Mateo, CA (US); Jooyoung John Kim, Palo Alto, CA (US); Krisztian Z. Danko, Waterloo (CA); Peter J. Stengard, St. Pete Beach, FL (US); Ari Mozes, Lexington, MA (US); Marcos Campos, Billerica, MA (US)

(73) Assignee: Oracle International Corporation, Redwood Shores, CA (US)

(*) Notice: Subject to any disclaimer, the term of this patent is extended or adjusted under 35 U.S.C. 154(b) by 1043 days.

(21) Appl. No.: 12/486,933

(22) Filed: Jun. 18, 2009

(65) Prior Publication Data

US 2010/0114992 A1 May 6, 2010

Related U.S. Application Data

(60) Provisional application No. 61/110,729, filed on Nov. 3, 2008.

(51) Int. Cl.
| | |
|---|---|
| *G06F 7/00* | (2006.01) |
| *G06F 17/30* | (2006.01) |
| *G06Q 30/02* | (2012.01) |
| *G06Q 10/06* | (2012.01) |
| *G06F 17/00* | (2006.01) |

(52) U.S. Cl.
CPC ...... *G06Q 30/0202* (2013.01); *G06F 17/30339* (2013.01); *G06F 17/30955* (2013.01); *G06Q 10/067* (2013.01); *G06Q 30/02* (2013.01); *G06Q 30/0204* (2013.01)

(58) Field of Classification Search
CPC .................. G06F 17/30339; G06F 17/30955

USPC .................. 707/703, 999.001–999.005, 792
See application file for complete search history.

(56) References Cited

U.S. PATENT DOCUMENTS

| | | | |
|---|---|---|---|
| 5,812,840 A * | 9/1998 | Shwartz | 707/999.004 |
| 6,067,525 A | 5/2000 | Johnson et al. | |
| 7,120,629 B1 | 10/2006 | Seibel | |
| 7,174,341 B2 * | 2/2007 | Ghukasyan et al. ... | 707/999.001 |
| 7,275,083 B1 | 9/2007 | Seibel | |
| 7,370,033 B1 | 5/2008 | Roychowdhury | |
| 2002/0029220 A1 | 3/2002 | Oyanagi et al. | |
| 2002/0107858 A1 | 8/2002 | Lundahl et al. | |

(Continued)

OTHER PUBLICATIONS

Prem Melville et al.; "Finding New Customers Using Unstructured and Structured Data"; IBM T.J. Watson Research Center; Aug. 12-15, 2007; San Jose, CA; pp. 1-8.; http://www.cs.utexas.edu/~melville/papers/ascot-kdd07.pdf.

(Continued)

*Primary Examiner* — Kannan Shanmugasundaram
(74) *Attorney, Agent, or Firm* — Miles & Stockbridge P.C.

(57) ABSTRACT

A data importer for a sales prospecting system imports one or more data tables that each may include one or more records. The data importer first (a) imports a data table into an intermediate table. The data importer then (b) determines if the imported data table depends on another data table and moves one or more records from the imported data table that have no missing dependencies to a corresponding working table; and (c) determines a set of previously imported data tables that refer to the imported data table. The data importer then, for each previously imported data table, repeats (b) and (c) above.

15 Claims, 7 Drawing Sheets

(56) References Cited

U.S. PATENT DOCUMENTS

| | | | |
|---|---|---|---|
| 2002/0161664 A1 | 10/2002 | Shaya et al. | |
| 2002/0174119 A1 | 11/2002 | Kummamuru et al. | |
| 2003/0063779 A1 | 4/2003 | Wrigley | |
| 2003/0182175 A1 | 9/2003 | Buie et al. | |
| 2003/0216956 A1 | 11/2003 | Smith et al. | |
| 2004/0103017 A1 | 5/2004 | Reed et al. | |
| 2005/0149466 A1 | 7/2005 | Hale et al. | |
| 2005/0210049 A1* | 9/2005 | Foster | 707/100 |
| 2006/0047717 A1* | 3/2006 | Pereira | 707/204 |
| 2006/0229932 A1 | 10/2006 | Zollo | |
| 2007/0033098 A1 | 2/2007 | Peters | |
| 2007/0112614 A1 | 5/2007 | Maga et al. | |
| 2007/0112733 A1 | 5/2007 | Beyer et al. | |
| 2007/0220027 A1* | 9/2007 | Richey et al. | 707/101 |
| 2007/0244741 A1 | 10/2007 | Blume et al. | |
| 2008/0162574 A1 | 7/2008 | Gilbert | |

OTHER PUBLICATIONS

Call Center Technology; "DSC Tech Library"; copyright © 1998-20009 Database Systems Corp, last modified: 2009; pp. 1-5; http://www.databasesystemscorp.com/tech-call_centers_42.htm.

Management&Technology, Manufacturer Digest; "Customer Relations Management (CRM)"; Oct. 20, 2002; pp. 30-36; http://www.ncs.com.sg/documents/manufac.%20digest%2023%20oct%2000.pdf.

Acxiom FirmographicX TM; "Australia's First B2B Marketing Segmentation Solution."; www.acxiom.com.au; © 2007 Acxiom Corporation; pp. 1-2; http://www.acxiom.com.au/AppFiles/Download124/Fact_Sheet_-_Acxiom_FirmographicX-1211200771218.pdf.

S. Aramuga Perumal; "Integrating E-Commerce and CRM With Data Mining: A New Era"; Journal of Internet Banking and Commerce; Dec. 2005; vol. 10, No. 3; pp. 1-7; http://www.arraydev.com/commerce/JIBC/2006-02/crm.htm.

MITSloan Management Review; "The Prediction Lover's Handbook"; Jan. 7, 2009; p. 1; Copyright © Massachusetts Institute of Technology; http://sloanreview.mitedu/the-magazine/articles/2009/winter/50208/the-prediction-lovers-handbook/.

Ruth N. Bolton et al.; "Managing Customer Relationships"; pp. 3-38; http://www.ruthnbolton.com/Publications/01Malhotra-V3-Chap1.pdf; downloaded Sep. 18, 2009.

Omniture; "Online Marketer's Segmentation Guide"; www.omniture.com; Feb. 2007; http://www.wsiuniquewebdesign.co.za/files/segmentation_guide.pdf.

* cited by examiner

DATA IMPORTER FOR A SALES PROSPECTOR

CROSS REFERENCE TO RELATED APPLICATIONS

This application claims priority to provisional application No. 61/110,729 filed Nov. 3, 2008, which is hereby incorporated by reference.

FIELD OF THE INVENTION

One embodiment is directed generally to customer sales, and more particularly to importing data into a customer sales system.

BACKGROUND INFORMATION

A sales lead includes a name or other indicia of identity (e.g., a phone number, mailing address or email address) of a person or business that may have an interest in purchasing a product or service. A sales lead provides a starting point for a salesperson to further develop the lead by marketing a specific vendor's product or service. The salesperson develops the sales lead by gathering information about the potential customer and providing the customer with information about the vendor. This mutual exchange of information helps the salesperson to persuade the potential customer to purchase a product or service from the vendor. If the customer makes a purchase, the salesperson has converted the sales lead into a sales transaction. A sales lead with a high probability of being converted into a sales transaction is considered a good lead.

Data mining can assist in generating sales leads by finding patterns in information gathered about customers. In the past, vendors have used data mining to match potential customers to products. To do so, data about customers, products, product categories, and previous purchases are imported into an application to generate the sales lead. Components or tools that import data from one system to another are often expected to ensure that the imported data has referential integrity for the receiving application to work. For example, if both customers and orders are imported from an external system, it is expected that the order records refer to customer records that actually exist.

A conventional import implementation ensures integrity by rejecting "bad" records and only accepting records for which all related records exist. For this reason, this implementation also requires that different types of records are imported in a certain order. For example, if order records depend on customers, then the customer records must be imported before the order records are imported. In some cases, these dependencies can be complex and hard to follow. Consider the following example: "order lines" refers to orders and products; "orders" refers to customers; and "products" refers to product categories. Using this example, the conventional implementation must import the record in the following order: product categories, products, customers, orders, order lines. If this order is not followed, some imported records will be rejected and the user will have to begin again.

SUMMARY OF THE INVENTION

One embodiment is a data importer for a sales prospecting system that imports one or more data tables that each may include one or more records. The data importer first (a) imports a data table into an intermediate table. The data importer then (b) determines if the imported data table depends on another data table and moves one or more records from the imported data table that have no missing dependencies to a corresponding working table; and (c) determines a set of previously imported data tables that refer to the imported data table. The data importer then, for each previously imported data table, repeats (b) and (c) above.

DETAILED DESCRIPTION

One embodiment is a sales prospector that identifies potential sales prospects and analyzes the past purchasing patterns of customers (throughout this specification, "customer" may refer to existing or potential customers). In one embodiment, a "prospect" is a combination of a customer and a specific product, which may be used to prepare for a sales call. One embodiment predicts which customers in a sales representative's territory will be interested in purchasing certain products, based on an analysis of the buying patterns of similar customers. A sales representative can see what the next purchases are likely to be for their customers, as well as the probability, revenue potential, and time to close for each prediction. In addition, they can drill down into the details to do further analysis.

Generally, an administrator first uploads customer data tables with which to train a prediction model. The customer data tables imported to train the model, such as product categories, products, customers, orders, and order lines, should be imported with full referential integrity, though tolerating a small number of missing records.

For example, a customer data table may include a list of customer accounts. A products data table may include a list of products available for sale. An orders data table may include the order header information that identifies an order. An order lines data table may comprise order detail information, such as the products ordered, the product quantity, the product price, and the date of the sales lead that led to this order. Even if certain elements of order lines data are missing, the sales prospector can still use the information to make predictions. For example, the presence of an order lines record itself can affect the probability of purchase; products already owned by a customer would not be recommended. The presence of an order amount record can help predict revenue even if other elements are left blank. The presence of an order date and lead date help predict time-to-close even if other elements are left blank. The presence of an order date and amount exhibit the customers purchasing history, even if other elements are left blank.

One embodiment ensures that all the references among the tables exist, while not limiting the order in which the tables must be imported. For example, order lines can be imported before customers and products without being rejected. The import processor in accordance with one embodiment achieves this by importing records in two stages. In the first stage, all imported records are accepted into an intermediate holding table where referential integrity is not yet checked. Once all of the related records have arrived, the "clean" records (i.e., records whose referential integrity has been determined) are moved into a working table.

Figure 1:
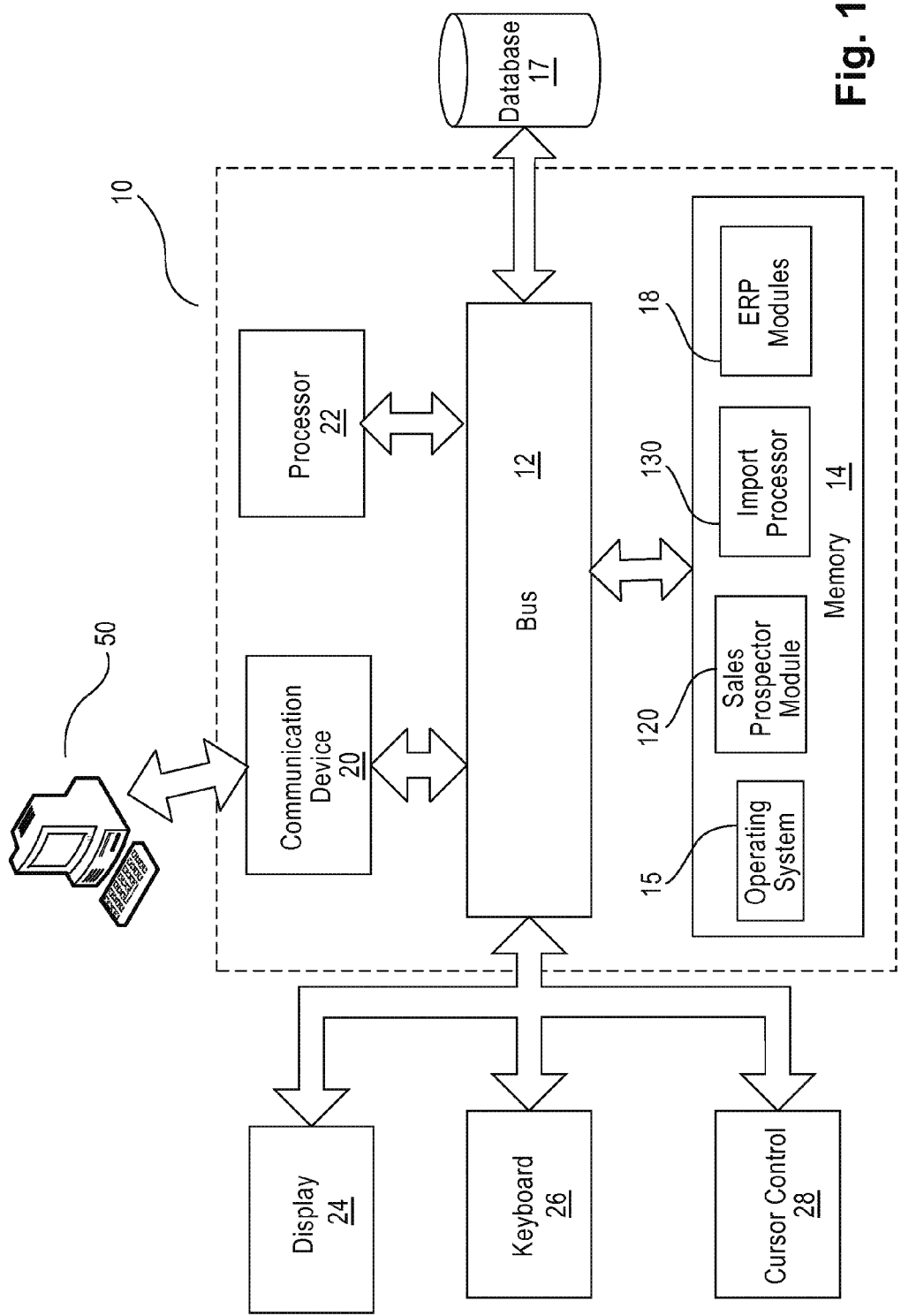
FIG. 1 is a block diagram of a system that can implement a sales prospector in accordance with an embodiment.

FIG. 1 is a block diagram of a system 10 that can implement an embodiment of an optimized sales prospector. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network (such as the Internet) or any other method.

Computer readable media/medium may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a sales prospector module 120 and an import processor 130, which are described in greater detail below. The modules may further include enterprise resource planning ("ERP") modules 18 of an ERP system that may interact with sales prospector module 120. An ERP system is a computer system that integrates several data sources and processes of an organization into a unified system. A typical ERP system uses multiple components of computer software and hardware to achieve the integration. A unified ERP database 17, coupled to bus 12, is used to store data for the various system modules. In one embodiment, ERP modules 18 are part of the "Oracle E-Business Suite Release 12" ERP system from Oracle Corp. In other embodiments, sales prospector module 120 and import processor 130 may be a stand-alone system and not integrated with an ERP system, or may be part of any other integrated system. In some embodiments, the functions of sales prospector module 120 and import processor 130, described below, are directed and utilized remotely from a user's computer 50 through communication device 20. In one embodiment, the functionality disclosed below may be accessed remotely by a user as a software as a service ("SAAS").

Figure 2:
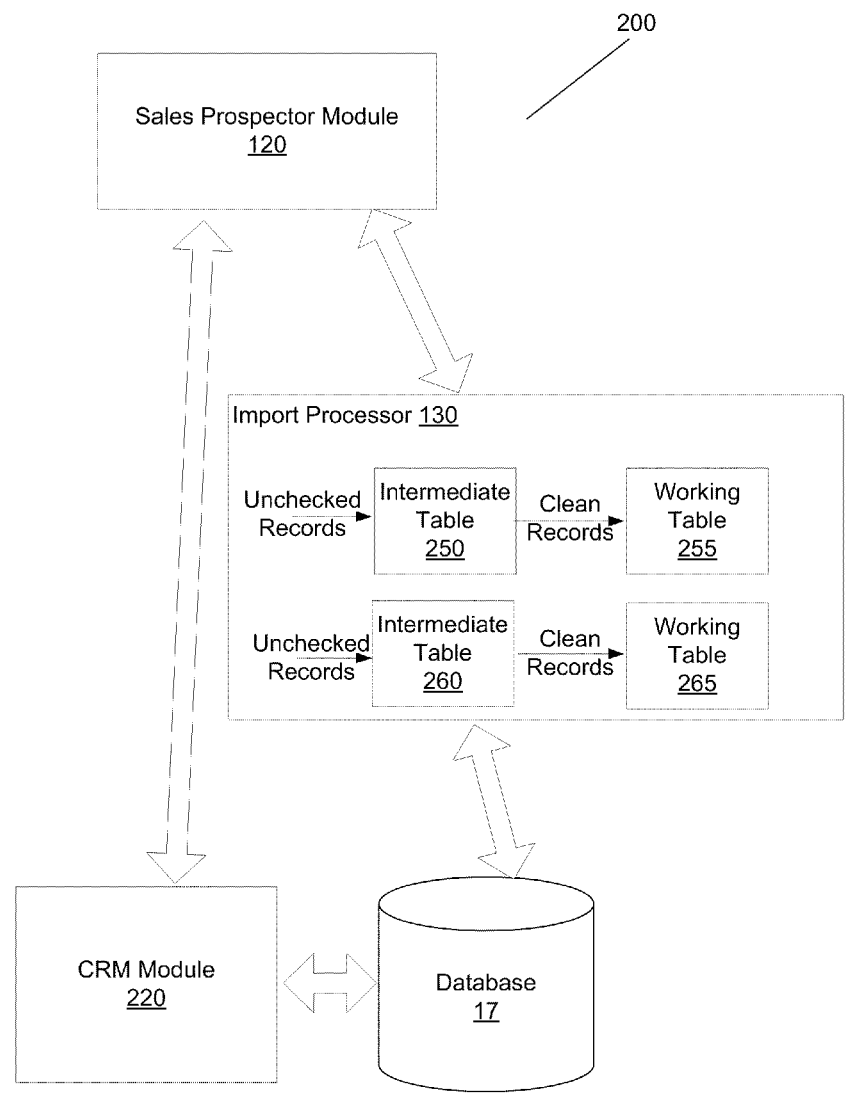
FIG. 2 illustrates a logical diagram of a sales prospector with a data import processor in an accordance with an embodiment.

FIG. 2 illustrates a logical diagram of a customer relationship management ("CRM") system 200 in which sales prospector module 120 and import processor 130 may be used in accordance with an embodiment. CRM module 220 is an ERP module for managing customer information, including demographic data about a customer, purchasing patterns, assets owned, etc. CRM module 220 includes schemas for the customer data, and interacts with database 17 to store the customer data in database 17 in accordance with these schemas. Sales prospector module 120 includes user interfaces (described below) for viewing customer data, for entering queries for sales prospects, and for viewing the results of those queries. Sales prospector 120 imports customer data using import processor 130 from database 17. Import processor 130 includes intermediate tables 250 and 260, and corresponding working tables 255 and 265. When a table of sales data is imported, it is first stored as unchecked records in an intermediate table, for example, intermediate table 250. After referential integrity has been determined for the imported sales data (i.e., the records in the data refer to existing tables), the data is moved as clean records to the corresponding working table, which is working table 255 in this example. One of ordinary skill in the art will recognize that import processor 130 may include as many intermediate and working tables as needed.

Figure 3:
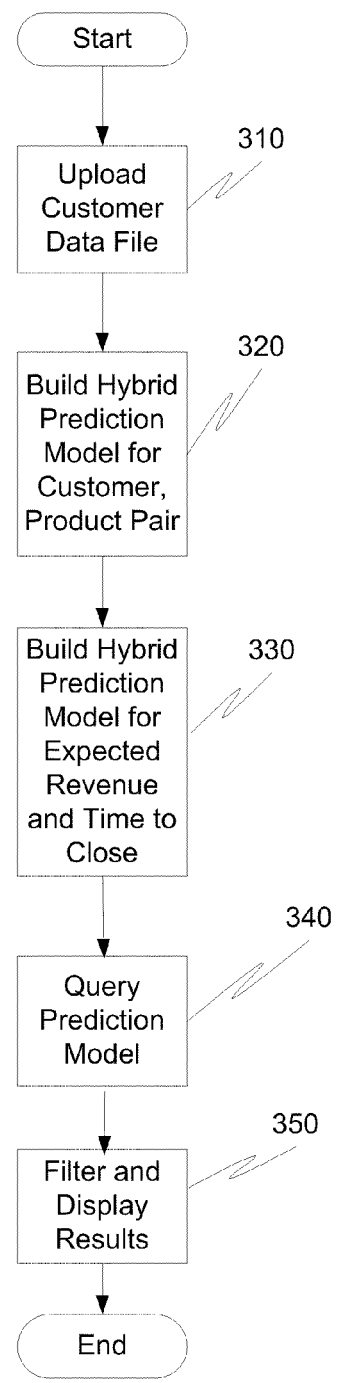
FIG. 3 illustrates a flow diagram of the functionality of the sales prospector in accordance with an embodiment.

FIG. 3 illustrates a flow diagram of the functionality of a sales prospector module 120 in accordance with an embodiment. In one embodiment, the functionality of the flow diagram of FIG. 3, and FIG. 4 described below, is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

An administrator of the system 10 first imports customer data into sales prospector module 120 in the form of a Comma Separated Value ("CSV") file (310). The customer data may be imported by import processor 130, for example, from database 17, and includes both purchasing pattern attributes and demographic attributes. The CSV files are a fixed file format that include five record types: customers, products, orders, order lines, and target customers by user. The CSV file formats follow a specific format, described below, in an embodiment. The CSV files may be imported into sales prospector module 120 in any order. For sales prospector module 120 to make a prediction, at least the following record types should be present: customers, products, orders, and order lines. In the CSV file, each column is separated by a comma, and each record starts on a new line.

A sample customers.csv file is now described. Table 1 illustrates the data types for customer records:

TABLE 1

| Column | Data Type | Max. Length | Required | Description |
| --- | --- | --- | --- | --- |
| Customer_ID | String | 30 Char. | Yes | Customer identifier |
| Customer_Name | String | 200 Char. | Yes | Customer name |
| Customer_Location | String | 300 Char. | No | Customer location |
| Owner_Email | String | 100 Char. | Yes | Email address of account owner |
| Owner_Name | String | 200 Char. | Yes | Name of the customer account owner |
| VarChar_1 | String | 200 Char. | No | Industry |
| VarChar_2 | String | 200 Char. | No | Headquarter's country |
| VarChar_3 | String | 200 Char. | No | Public or Private |
| VarChar_4 | String | 200 Char. | No | Importer or Exporter |
| VarChar_5 | String | 200 Char. | No | Custom string field |

TABLE 1-continued

| Column | Data Type | Max. Length | Required | Description |
|---|---|---|---|---|
| Numeric_1 | Number | 10 digits | No | Annual revenue |
| Numeric_2 | Number | 10 digits | No | Number of employees |
| Numeric_3 | Number | 10 digits | No | Number of locations |
| Numeric_4 | Number | 10 digits | No | Custom numeric field |
| Date_1 | Date | N/A | No | Custom date field |

An example customers.csv file is presented below:

```
Customer_ID, Customer_Name, Customer_Location,
Owner_Email, Owner_Name, VarChar_1, VarChar_2,
VarChar_3, VarChar_4, VarChar_5, VarChar_6,
VarChar_7, VarChar_8, VarChar_9, VarChar_10, Numeric_1,
Numeric_2, Numeric_3, Numeric_4, Numeric_5, Numeric_6,
Numeric_7, Numeric_8, Numeric_9, Numeric_10, Date_1, Date_2,
Date_3, Date_4, Date_5, Date_6, Date_7, Date_8, Date_9, Date_10
Cust-01, Customer 1 Name, , brenda.moore@company.com,
Brenda Moore, Manufacturing, Canada, Public, Both, , , , , , , 4521,
135, 3, , , , , , , , , , , , , , , ,
Cust-02, Customer 2 Name, USA, donna.parker@company.com, Donna
Parker, Financial Services, USA, Public, Importer, , , , , , , 12129, 929, 6,
, , , , , , , , , , , , , , ,
```

A sample products.csv file is now described. Table 2 illustrates the data types for product records:

TABLE 2

| Column | Data Type | Max. Length | Required | Description |
|---|---|---|---|---|
| Product_ID | String | 30 Char. | Yes | Product identifier |
| Product_Name | String | 100 Char. | Yes | The product name |

An example products.csv file is presented below:

```
Product_ID, Product_Name
Prod-01, Oracle Database 10g
Prod-02, Oracle Database 11g
```

A sample orders.csv file is now described. Table 3 illustrates the data types for order records:

TABLE 3

| Column | Data Type | Max. Length | Required | Description |
|---|---|---|---|---|
| Order_ID | String | 30 Char. | Yes | Order header identifier |
| Customer_ID | String | 30 Char. | Yes | Identifies customer on this order |

An example orders.csv file is presented below:

```
Order_ID, Customer_ID
Order-01, Cust-01
Order-02, Cust-02
```

A sample order_lines.csv file is now described. Table 4 illustrates the data types for order line records:

TABLE 4

| Column | Data Type | Max. Length | Required | Description |
|---|---|---|---|---|
| Order_Line_ID | String | 30 Char. | Yes | Order line identifier |
| Order_ID | String | 30 Char. | Yes | Order identifier |
| Product_ID | String | 30 Char. | Yes | Product_ID references a product in the Products.csv file |
| Quantity | Number | 15 digits with 2 decimal places | No | Quantity sold on this order line |
| Amount | Number | 15 digits with 2 decimal places | No | The order line amount |
| Close_Date | Date | N/A | No | The date when the product sale is closed |
| Lead_Date | Date | N/A | No | The date when the lead that resulted in this order line was received |

An example order_line.csv file is presented below:

```
Order_Line_ID, Order_ID, Product_ID, Quantity, Amount,
Close_Date, Lead_Date
Order-Ln-01, Order_01, Prod-01, 10, 10, 2007-02-06, 2008-10-15
Order-Ln-02, Order_02, Prod-02, 50, 50, 2007-03-09, 2009-02-15
```

A sample member_customers.csv file is now described. Table 5 illustrates the data types for user-to-customer mapping records:

TABLE 5

| Column | Data Type | Max. Length | Required | Description |
|---|---|---|---|---|
| User_Email | String | 100 Char. | Yes | The email address of a community member |
| Customer_ID | String | 30 Char. | Yes | The customer identifier |
| Operation | String | 2 Char. | Yes | Indicates whether the current recod should be inserted or deleted in the database, as follows: "I" indicates an insert. The insert does not succeed if the record already exists "UC" indicates an update by customer "UM" indicates an update by member (the sales representative) "D" indicates delete |

An example member_customers.csv file is presented below:

```
User_Email, Customer_ID, Operation
brenda.moore@company.com, Cust-01, I
brenda.moore@company.com, Cust-02, I
donna.Parker@company.com, Cust-04, I
```

Figure 4:
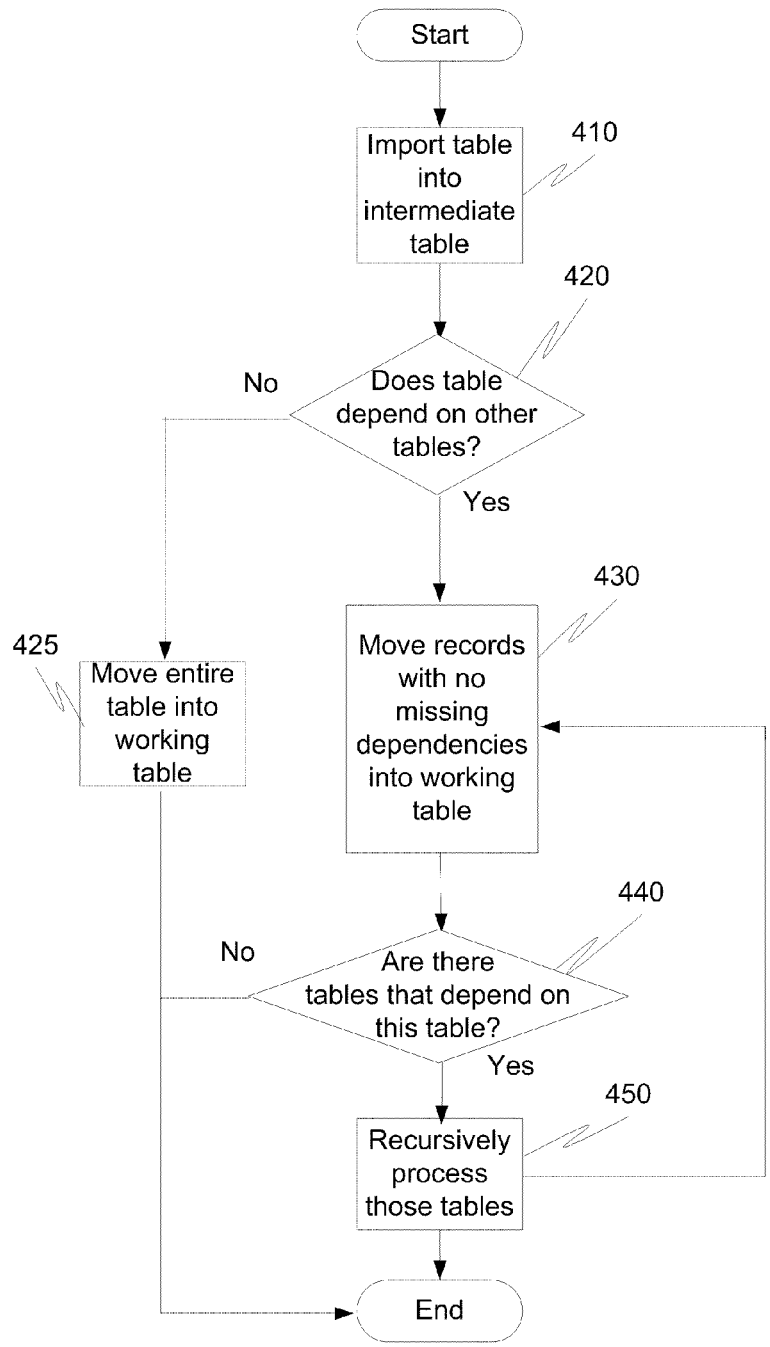
FIG. 4 illustrates a flow diagram of the functionality of the data import processor in accordance with an embodiment.
Figure 5:
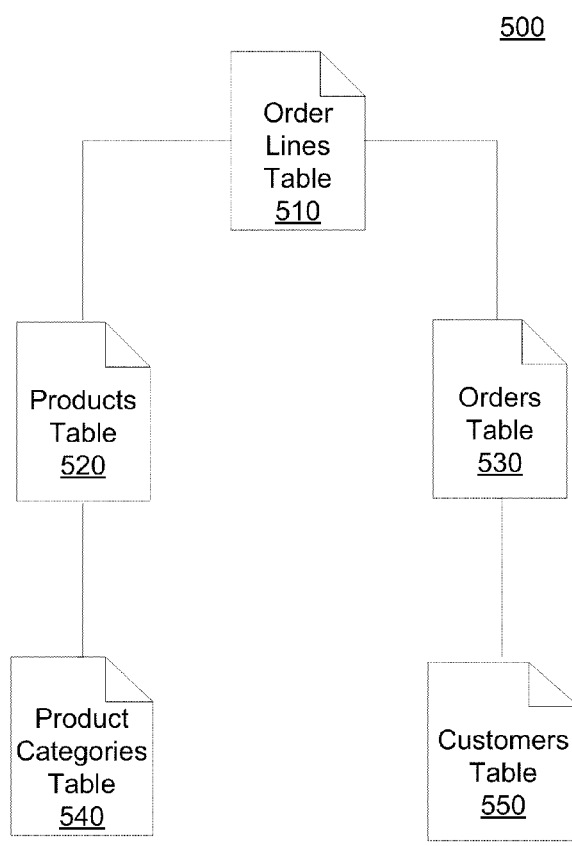
FIG. 5 illustrates an example dependency tree in accordance with an embodiment.

The administrator, when selecting data to import (310), need not import the customer data in a specific order to maintain referential integrity because of a two-stage process. In the first stage, all imported records are accepted into the intermediate holding table where referential integrity is not yet checked. Then, once all the related records arrive (which may happen at a later point in time) the "clean" records are moved into the production tables. FIG. 4 illustrates a flow diagram of the two-stage functionality of import processor 130 in accordance with an embodiment. For each table selected for import, import processor 130 accepts all records and stores the records in a corresponding intermediate table (410). No integrity checking is performed yet, thus a products table can be imported and referred to a products categories table that does not yet exist. Import processor 130 then determines if the imported table depends upon other tables (420). For example, a products table may depend on a products categories table because product records depend on product category records. Likewise, an order lines table may depend on the products table. FIG. 5 illustrates an example dependency tree 500 in accordance with an embodiment. Order lines table 510 depends on both products table 520 and orders table 530. In turn, products table 520 depends on product categories table 540, and orders table 530 depends on customers table 550.

Returning to FIG. 4, if the imported table does not depend on any other table, import processor 130 moves the imported table to a working table and is finished (425). Otherwise, import processor 130 moves just the records in the imported table with no missing dependencies into a corresponding working table (430). For example, a single products record that refers to an already existing product categories record would be moved to the working table for products. Import processor 130 next determines if any other tables already imported depend on the newly imported table (440). For example, an order lines table may have already been imported and is being held in an intermediate table, and order lines may depend upon the products table. If such a case exists, that depending table is selected for dependency checking (450), and the process is recursively repeated by moving records with now fulfilled dependencies into working tables (430) until the top of the dependency tree is reached with a table on which no other tables depend.

Returning to FIG. 3, a hybrid prediction model is then built from the imported data for predicting a prospect, i.e., a customer, product, and a probability that the potential transaction will materialize if pursued (320). Then, a hybrid prediction model is built to predict expected revenue and expected time to close (330). After the hybrid predictive models are built, a user can query the models to return a sales prospect (340). For example, a user can enter a customer name to get a product, probability of close, estimated time to close, and expected revenue. Or, a user can enter a product name to get a customer, probability of close, estimated time to close, and expected revenue. Alternatively, a user can search all customers and products for customer-product pairs, including probability of close, estimated time to close, and expected revenue. The user can also filter the results of the query based on factors such as, but not limited to, a minimum probability of close, minimum expected revenue, maximum time to close, partial customer name, partial product name, etc. (350).

Figure 6:
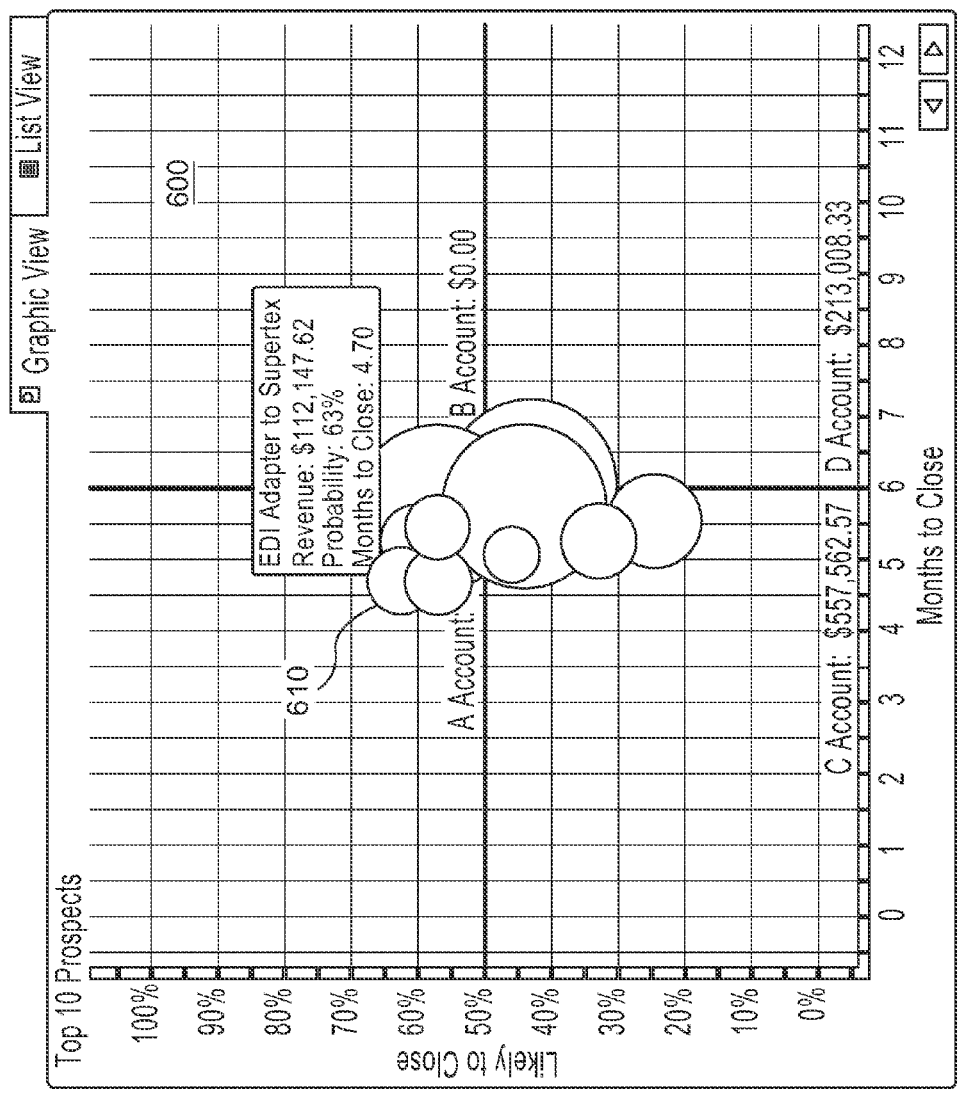
FIG. 6 illustrates an example user interface of the sales prospector in accordance with an embodiment.

FIG. 6 illustrates an example graphical output user interface 600 of the sales prospector module 120 in accordance with an embodiment, which shows each prospect as a bubble or circle on the graph. The Y-axis represents the probability of close for that prospect, the X-axis represents the expected time to close, and the size of the bubble for the prospect represents expected revenue for that prospect (i.e., a combination of a customer and a specific product). More details of each prospect can be displayed by hovering the mouse over a bubble or otherwise selecting a bubble that represents a prospect. In the example shown, the additional information for prospect/bubble 610 indicates that the product is "EDI Adapter" and the customer is "Supertex Inc.," with an expected revenue of $112,147.62, an expected time to close of 4.7 months, and probability of close of 63%.

Figure 7:
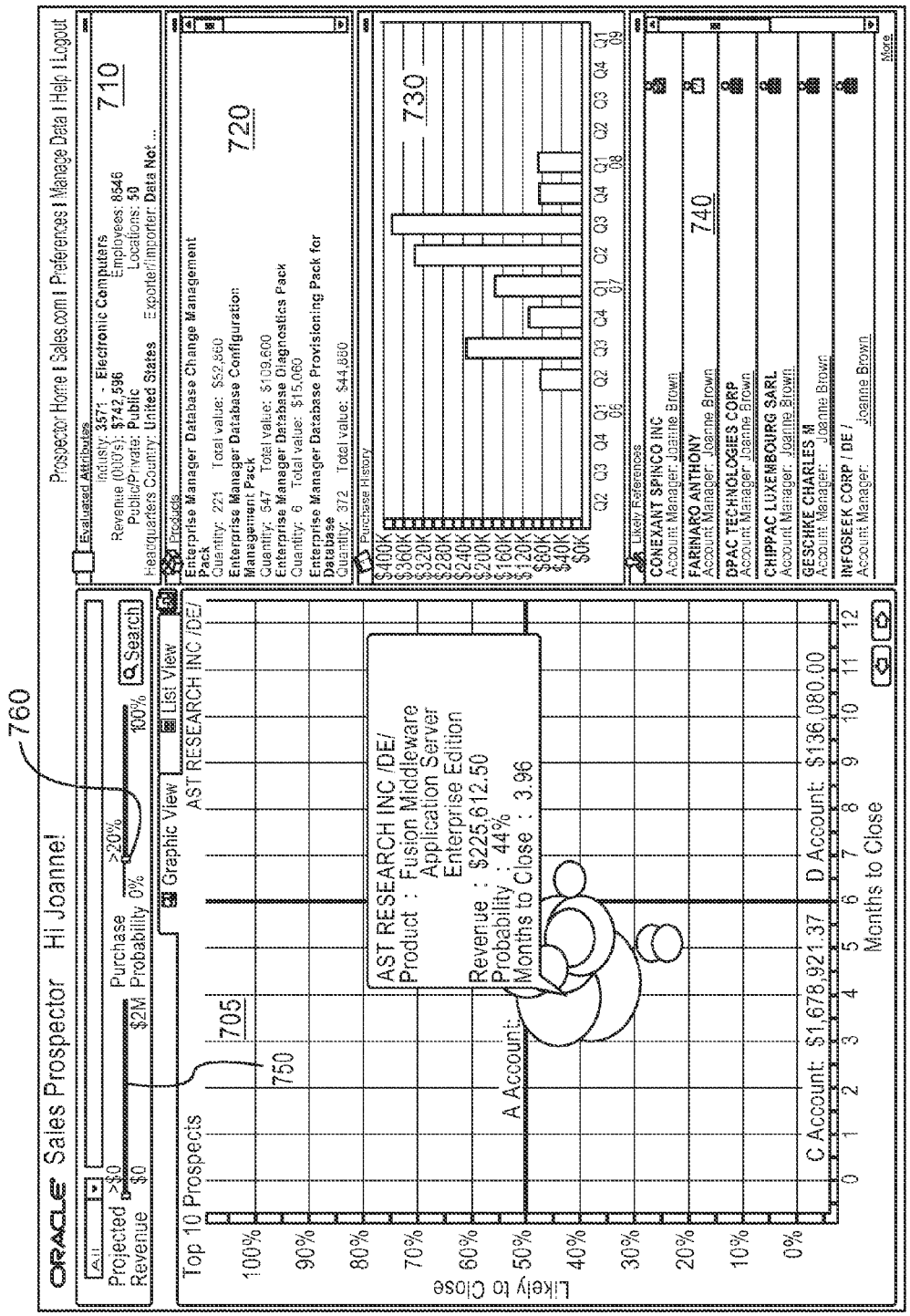
FIG. 7 illustrates another example user interface of the sales prospector in accordance with an embodiment.

FIG. 7 illustrates an example graphical output user interface 700 of the sales prospector module 120 in a dashboard view, in accordance with an embodiment. In addition to the graph view 705, similar to what is shown in FIG. 6, dashboard user interface 700 further shows evaluated attributes of a customer 710 (in this example, AST Research); a products list 720 listing recommended products for a sales call; a purchase history 730 for the particular customer, including in this example a graph of money spent on products over the past 16 quarters; and a references list 740 that lists customers of similar needs, demographics, and purchasing patterns that can be used for a sales call. Further, dashboard user interface 700 includes a projected revenue filter slider 750 for filtering results in graph view 705 based on the projected revenue of the sale if completed; and a purchase probability slider 760 for filtering results in graph view 705 based on the probability that the sale will be completed. Therefore, specific filters when searching for prospects can be used to display, for example, prospects with an expected revenue greater than $100,000; which products a specific customer is most likely to purchase; or which prospects are expected to generate the most revenue for a specific product.

As disclosed, one embodiment is a hybrid prediction model combining demographic data and purchasing pattern data with an optimized data import processor. Data tables used to train the model may be imported in any order by the data import processor without concern for referential integrity, which is ensured by a two-stage process. In the first stage, all imported records are accepted into an intermediate holding table where referential integrity is not yet checked. Then, once all the related records arrive (which may happen at a later point in time) the "clean" records are moved into the production tables. The model may then be used to understand a customer's demographic, financial and commercial profile; understand a customer's buying patterns; consider the sales recommendations that it generates based on the probability of purchase and the purchase history; estimate a time frame for sales to close and potential estimated revenue; and estimate the potential revenue from a sale. Thus, it is more effective at generating sales leads that will reduce the time investment of sales people while increasing the profitability of leads that are pursued.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A non-transitory computer-readable medium having instructions stored thereon that, when executed by a processor, cause the processor to import one or more data tables that each comprise one or more records into corresponding intermediate tables and working tables, the importing comprising:
receiving a selection of data tables from a database to import, wherein dependencies among the selected data tables are according to a dependency tree comprising at least two branches connecting a first group of at least three data tables with three different corresponding record types, wherein each branch of the dependency tree that connects a second group of two data tables with two different corresponding record types corresponds to all attributes that are in common between the two different corresponding record types;

importing the selected data tables into one or more intermediate tables;

(a) for a first data table, if the first data table does not depend on another data table as defined by the dependency tree, moving the first data table to a first working table;

(b) if the first data table depends on a second data table as defined by the dependency tree, determining which records of the first data table depend only on records that have already been imported from the database into the intermediate tables or the working tables, and moving to the first working table the determined records, wherein the first data table comprises a plurality of first data table records, and the determined records in addition to remaining records comprises the plurality of first data table records, wherein the remaining records remain in a first intermediate table when the determined records are moved to the first working table;

(c) determining a next data table that has been imported to a next intermediate table and that depends on the first data table as defined by the dependency tree; and assigning the next data table as the first data table and repeating (b) and (c);

wherein (a)-(c) are executed at least once before all of the data tables in the dependency tree are imported into the one or more intermediate tables.

2. The computer-readable medium of claim 1, further comprising:

repeating (a)-(c) for each table to be imported.

3. The computer-readable medium of claim 1, where the first data table is one of: a customer data table, a product data table; a product category data table; an order data table; or an order lines data table.

4. The computer-readable medium of claim 1, wherein the customer data table includes at least one of: a customer name record; a customer location record; an industry record; a headquarter country record; a public corporation status record; an importer status record; an exporter status record, a number of locations record; a number of employees record; or an annual revenue record.

5. The computer-readable medium of claim 3, wherein the product data table refers to the product category data table.

6. The computer-readable medium of claim 3, wherein the order data table refers to the product data table.

7. The computer-readable medium of claim 3, wherein the customer data table refers to the product data table.

8. The computer-readable medium of claim 1, wherein a plurality of data tables are imported out of referential order.

9. A computer-implemented method for importing a data table including a plurality of records into corresponding intermediate tables and working tables, the method comprising:

receiving a selection of data tables from a database to import, wherein dependencies among the selected data tables are according to a dependency tree comprising at least two branches connecting a first group of at least three data tables with three different corresponding record types, wherein each branch of the dependency tree that connects a second group of two data tables with two different corresponding record types corresponds to all attributes that are in common between the two different corresponding record types;

importing the selected data tables into one or more intermediate tables;

(a) for a first data table, if the first data table does not depend on another data table as defined by the dependency tree, moving the first data table to a first working table;

(b) if the first data table depends on a second data table as defined by the dependency tree, determining which records of the first data table depend only on records that have already been imported from the database into the intermediate tables or the working tables, and moving to the first working table the determined records, wherein the first data table comprises a plurality of first data table records, and the determined records in addition to remaining records comprises the plurality of first data table records, wherein the remaining records remain in a first intermediate table when the determined records are moved to the first working table;

(c) determining a next data table that has been imported to a next intermediate table and that depends on the first data table as defined by the dependency tree; and assigning the next data table as the first data table and repeating (b) and (c);

wherein (a)-(c) are executed at least once before all of the data tables in the dependency tree are imported into the one or more intermediate tables.

10. The computer-implemented method of claim 9, further comprising:

repeating (a)-(c) for each table to be imported.

11. The computer-implemented method of claim 9, where the first data table is one of: a customer data table; a product data table; a product category data table; and order data table; or an order lines data table.

12. The computer-implemented method of claim 9, wherein a plurality of data tables are imported out of referential order.

13. A data import processor for importing one or more selected data tables that each comprise one or more records from a database, the processor comprising:

a plurality of intermediate tables;

a plurality of working tables corresponding to the plurality of intermediate tables; and means for importing the selected data tables into one or more intermediate tables, wherein dependencies among the selected data tables are according to a dependency tree comprising at least two branches connecting a first group of at least three data tables with three different corresponding record types, wherein each branch of the dependency tree that connects a second group of two data tables with two different corresponding record types corresponds to all attributes that are in common between the two different corresponding record types;

(a) for a first data table, if the first data table does not depend on another data table as defined by the dependency tree, means for moving the first data table to a first working table;

(b) if the first data table depends on a second data table as defined by the dependency tree, means for determining which records of the first data table depend only on records that have been already been imported from the database into the intermediate tables or the working tables, and means for moving to the first working table the determined records, wherein the first data table comprises a plurality of first data table records, and the determined records in addition to remaining records comprises the plurality of first data table records, wherein the remaining records remain in a first intermediate table when the determined records are moved to the first working table;

(c) means for determining a next data table that has been imported to a next intermediate table and that depends on the first data table as defined by the dependency tree; and means for assigning the next data table as the first data table and repeating (b) and (c);

wherein (a)-(c) are executed at least once before all of the data tables in the dependency tree are imported into the one or more intermediate tables.

14. The data import processor of claim 13, wherein the data importer imports a plurality of data tables, each of the plurality of tables referring to at least one other data table.

15. The data import processor of claim 13, wherein a plurality of data tables are imported out of referential order.

\* \* \* \* \*